Figure 1:
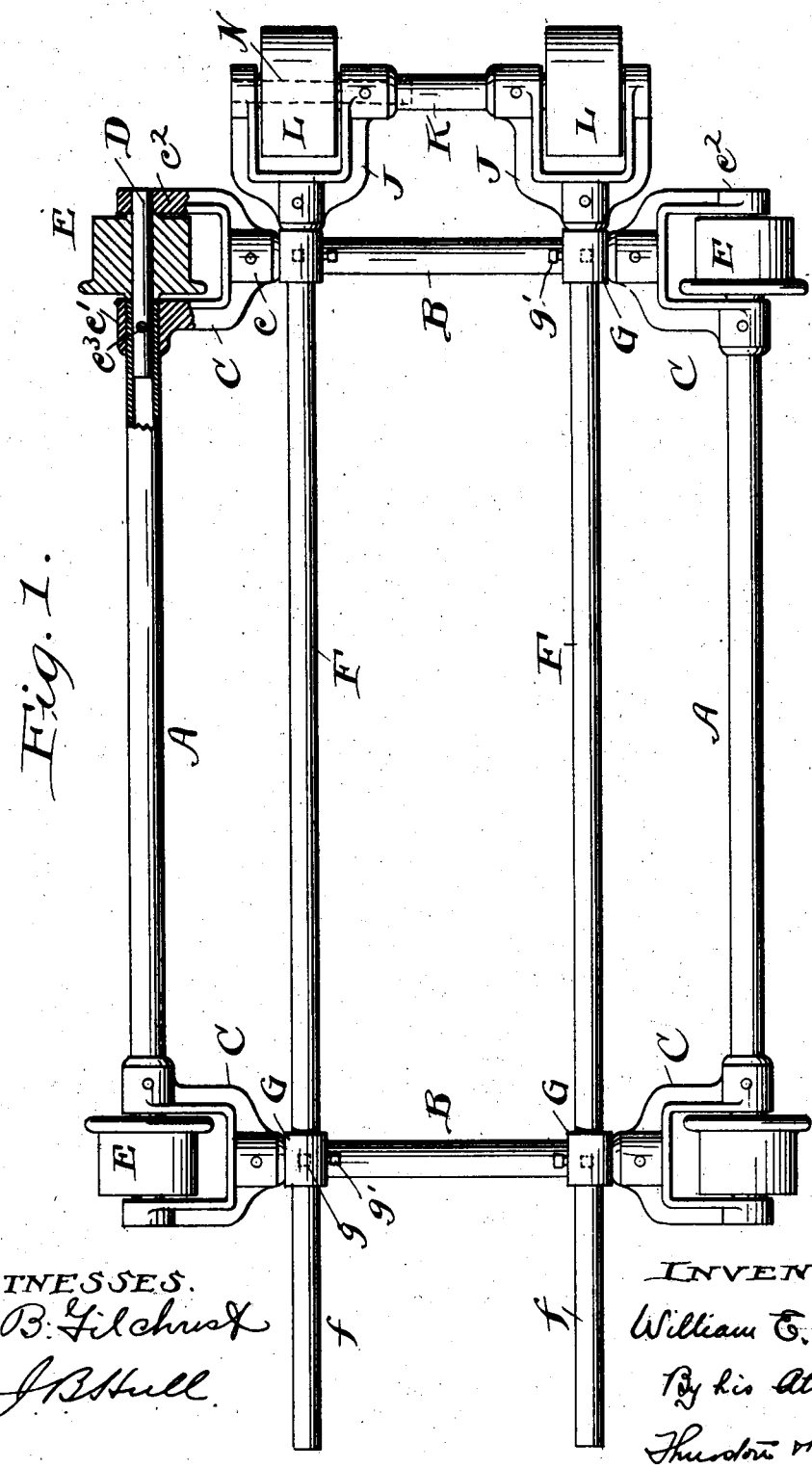

No. 758,990. PATENTED MAY 3, 1904.
W. E. LUDLOW.
RAILWAY TRUCK.
APPLICATION FILED FEB. 15, 1904.
NO MODEL. 2 SHEETS—SHEET 1.

WITNESSES. INVENTOR.
E. B. Gilchrist William E. Ludlow,
J. B. Hull. By his Attorneys,
Thurston & Bates.

No. 758,990. PATENTED MAY 3, 1904.
W. E. LUDLOW.
RAILWAY TRUCK.
APPLICATION FILED FEB. 15, 1904.
NO MODEL. 2 SHEETS—SHEET 2.
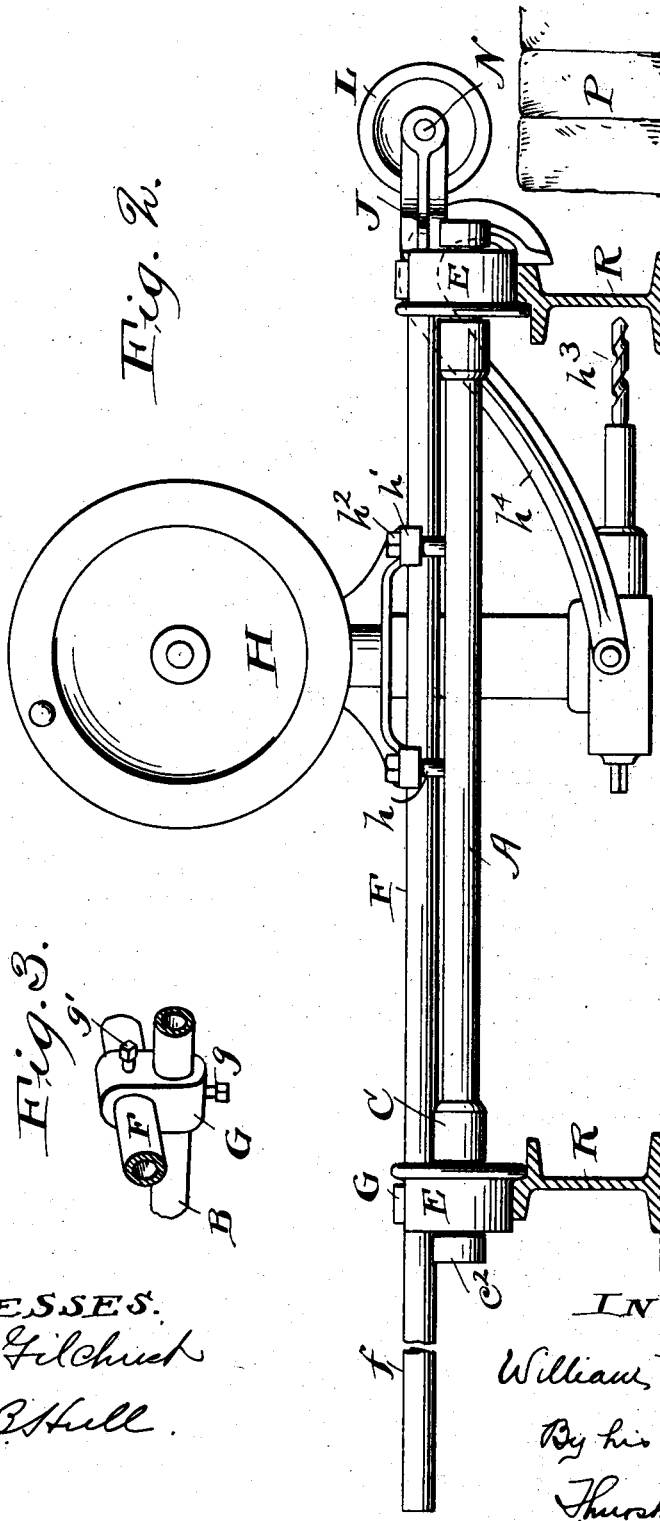
WITNESSES.
E. B. Gilchrist
J. B. Hull.
INVENTOR
William E. Ludlow,
By his Attorneys,
Thurston & Bates No. 758,990. Patented May 3, 1904.

UNITED STATES PATENT OFFICE.

WILLIAM E. LUDLOW, OF CLEVELAND, OHIO.

RAILWAY-TRUCK.

SPECIFICATION forming part of Letters Patent No. 758,990, dated May 3, 1904.

Application filed February 15, 1904. Serial No. 193,564. (No model.)

*To all whom it may concern:*

Be it known that I, WILLIAM E. LUDLOW, a citizen of the United States, residing at Cleveland, in the county of Cuyahoga and State of Ohio, have invented a certain new and useful Improvement in Railway-Trucks, of which the following is a full, clear, and exact description, reference being had to the accompanying drawings.

The object of this invention is to provide a strong and light truck adapted for railway use. The truck is particularly designed to carry mechanism, such as a drill, for operating upon the rail. The lightness of the truck is a very important feature, allowing it to be easily removed from the track to be out of the way of trains of cars. To increase the quickness of removal, I provide special derailing-wheels beyond one side of the truck and on axes transverse to those of the main wheels, so that by raising the other side of the truck it may be rolled off from the track sidewise.

The invention comprises the means adopted for attaining the above objects, or some of them, as hereinafter more fully explained and as definitely set out in the claims.

In the drawings, Figure 1 is a plan of my truck. Fig. 2 is a side elevation thereof, and Fig. 3 is a detail illustrating the means for connecting the cross-bars and the main frame of the truck.

The main frame of the truck is a horizontal rectangle composed of four tubular bars A A B B, held together at the corners of the rectangle by yokes C. Each yoke has a pair of sleeves $c$ and $c'$, into which the ends of the corresponding tubes project and snugly fit. Each yoke has also an arm $c^2$, extending opposite the sleeve $c'$. Axle-pins D extend outward from each end of the tubes A and have their outer ends supported by the yoke-arms $c^2$. On these axle-pins are journaled the supporting-wheels E. A pin $c^3$ may pass through the sleeve $c'$, the tube A, and the axle D and insure these parts being held in rigid position.

Extending across the upper sides of the bars B, which form the two side members of the truck, are the tubular bars F. These are held to the bars B where they cross them by clips G. Each of these clips is as shown in Fig. 3 and consists of a block having through it two horizontal openings at right angles to each other. Through one opening passes the bar B and through the other the bar F. Set-screws $g\ g'$, threaded in this block and bearing against the respective bars, may hold the bars F in place.

Mounted on the bars F may be a suitable drilling mechanism, as shown at H in Fig. 2. This mechanism rests upon the bars and is clamped to it by suitable U-shaped bolts $h$, extending under the bars and passing upward through feet $h'$ on the drilling mechanism and having nuts $h^2$ above such feet. At the lower end of the mechanism is a suitable drill-point $h^3$, adapted to operate on the rail. The drilling mechanism carries also a hook $h^4$, adapted to extend over onto the outer side of the rail.

The supporting-rails R are shown of an ordinary type for street-railway work, and it will be seen that the truck carries the drilling mechanism in suitable position to operate on the webs of the rails. The drilling mechanism may be adjusted on the bars F as required.

On one end of each bar F, on the same side of the truck, is provided a yoke J, similar to the yoke C. These two yokes J are connected together by a short tube-section K. Between the yokes are wheels L, journaled on axle-pins N, similar to the pins D. The wheels L have no flanges. Now if the side of the truck opposite the wheels L be lifted up these wheels may come into contact with some support, as the pavement P in street-railway work, whereupon the wheel-truck may be easily shoved laterally out of the way after the manner of a wheelbarrow. Experience has shown that two men can by this means more easily move the truck out of the way than four men could do without this roll-off mechanism.

To provide suitable handles for use of the men in rolling off the truck, I simply extend the bars F at the end opposite the wheels L, as shown at $f$. The extension of these bars may be greater than shown in Fig. 1, as illustrated by the break therein in Fig. 2. The extended bars $f$ have another function in that the drilling mechanism may be mounted upon them to do work on the outside of the rail, where switches or other internal obstructions prevent the drilling mechanism from operating from the inner side of the rail.

I claim—

1. A railway-truck composed of four tubular members, yoke-pieces connecting the same, and axle-pins and wheels within the yoke-pieces.

2. In a railway-truck, in combination, four tubes constituting the sides of a rectangle, horizontal yoke-pieces at the corners of such rectangle, sleeving around such tubes and connected to them, and wheels within the yoke-pieces.

3. In a railway-truck, in combination, tubular bars, yoke-pieces sleeving around such bars, wheels within the yoke-pieces, and axle-pins for said wheels, each pin seating at one end within one of said tubular bars and at the other end in arms carried by the yoke-pieces.

4. In a railway-truck, in combination, tubular bars, yoke-pieces connecting the same, each yoke-piece having an integral sleeve $c$ and an integral sleeve $c'$ at an angle thereto in which the ends of the corresponding tubular bars seat, each yoke having a projecting arm $c^2$ opposite the sleeve $c'$, an axle-pin carried at one end within the sleeve $c'$ and at the other end by the arm $c^2$, and a wheel on said axle-pin.

5. In a railway-truck, the combination of a wheeled frame, clips secured thereto and cross-bars extending through said clips.

6. In a truck, in combination, side bars, yokes rigidly connected to said bars, end bars connected to the yokes, wheels rotatably mounted within said yokes, intermediate cross-bars extending from one side bar to the other, and clips for securing said cross-bars to the side bars, substantially as described.

7. The combination of a truck composed of longitudinal bars having yokes at their ends, end cross-bars connecting the yokes on opposite sides of the truck, wheels journaled within said yokes, clips secured to said longitudinal bars, intermediate cross-bars secured to said clips, and mechanism mounted on the cross-bars for operating on the rail on which the truck rests.

8. In a railway-truck, in combination, a horizontal tubular frame, clips each consisting of a block perforated in two directions seating on two opposite members of said frame, and cross-bars occupying the other perforations of said clips.

9. In a railway-truck, in combination, a horizontal tubular frame, clips each consisting of a block perforated in two directions seating on two opposite members of said frame, cross-bars occupying the other perforations of said clips, and mechanism clamped to said cross-bars and depending to operate upon one of the rails on which the truck rests.

10. In a truck, in combination, wheels, longitudinal bars, cross-bars, means connecting them, clips secured to said longitudinal bars, intermediate cross-bars secured to said clips, said clips each consisting of a block with two holes through it at right angles, a longitudinal bar passing through one hole and a cross-bar through the other, and set-screws carried by the clip for clamping it to said bars, substantially as described.

11. In a railway-truck, the combination with a frame and flanged supporting-wheels therefor, a member rigidly extending from the frame to one side thereof, and a flangeless wheel journaled in said member on an axis which is rigid with reference to the axes of the supporting-wheels and is at right angles thereto.

12. The combination of mechanism adapted to operate on the rail, a wheel-truck which supports said mechanism and has a member which projects out from one side thereof, and a derailing-wheel mounted in said projecting member on an axis substantially at right angles to the axes of the main truck-wheels, substantially as described.

13. In a truck, the combination with the main frame and supporting-wheels, a pair of cross-bars secured thereto, a pair of yokes carried by the cross-bars beyond one side of the truck, a connection between said yokes, and wheels journaled within said yokes on axes substantially parallel with the track.

14. The combination, in a wheel-truck, of two bars which are secured to the side members of the truck-frame, and project out over each side thereof, derailing-wheels carried by one projecting end of said bars, the other projecting ends forming derailing-handles.

15. In a truck, the combination with the main frame and supporting-wheels, a pair of cross-bars secured thereto, a pair of yokes carried by the cross-bars beyond one side of the truck, a connection between said yokes, wheels journaled within said yokes on axes substantially parallel with the track, said cross-bars being extended beyond the opposite side of the truck to form roll-off handles.

16. In a railway-truck, the combination with an open horizontal frame and supporting-wheels carried thereby, of a pair of cross-bars supported by the frame and extending beyond one side thereof and mechanism for operating on the rail adjustably carried by said cross-bars, either between the rails or on the outer side thereof.

In testimony whereof I hereunto affix my signature in the presence of two witnesses.

WILLIAM E. LUDLOW.

Witnesses:
ALBERT H. BATES,
E. L. THURSTON.